United States Patent
Ferguson et al.

(10) Patent No.: US 9,440,652 B1
(45) Date of Patent: Sep. 13, 2016

(54) FILTERING NOISY/HIGH-INTENSITY REGIONS IN LASER-BASED LANE MARKER DETECTION

(71) Applicant: Google Inc., Mountain View, CA (US)

(72) Inventors: David I. Ferguson, San Francisco, CA (US); David Silver, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/987,031

(22) Filed: Jan. 4, 2016

Related U.S. Application Data

(63) Continuation of application No. 13/956,871, filed on Aug. 1, 2013, now Pat. No. 9,261,881.

(51) Int. Cl.

| | |
|---|---|
| *G01C 22/00* | (2006.01) |
| *B60W 30/12* | (2006.01) |
| *G05D 1/00* | (2006.01) |
| *B60W 30/18* | (2012.01) |
| *B60W 10/20* | (2006.01) |
| *B60W 10/18* | (2012.01) |
| *B60W 10/04* | (2006.01) |

(52) U.S. Cl.
CPC .............. *B60W 30/12* (2013.01); *B60W 10/04* (2013.01); *B60W 10/18* (2013.01); *B60W 10/20* (2013.01); *B60W 30/18163* (2013.01); *G05D 1/0088* (2013.01); *B60W 2420/52* (2013.01); *B60W 2550/12* (2013.01); *B60W 2710/18* (2013.01); *B60W 2710/20* (2013.01); *B60W 2720/10* (2013.01); *B60W 2900/00* (2013.01)

(58) Field of Classification Search
USPC .......................................................... 701/28
See application file for complete search history.

(56) References Cited

U.S. PATENT DOCUMENTS

| | | | | |
|---|---|---|---|---|
| 6,624,524 | B1 * | 9/2003 | Madurawe | H01L 23/5258 257/713 |
| 6,903,680 | B2 * | 6/2005 | Samukawa | G01S 17/936 180/167 |
| 7,071,104 | B1 * | 7/2006 | Madurawe | H01L 23/5258 257/E23.15 |
| 7,187,452 | B2 * | 3/2007 | Jupp | G06K 9/0063 356/3.01 |
| 7,271,762 | B2 * | 9/2007 | Samukawa | G01S 17/936 180/167 |
| 7,983,802 | B2 | 7/2011 | Breed | |
| 8,364,334 | B2 | 1/2013 | Au et al. | |

(Continued)

FOREIGN PATENT DOCUMENTS

| | | | | |
|---|---|---|---|---|
| AU | EP 1358508 B1 * | 2/2010 | | G01S 7/497 |
| DE | 10001015 C2 * | 11/2002 | | G01S 7/487 |

(Continued)

*Primary Examiner* — Jean-Paul Cass
(74) *Attorney, Agent, or Firm* — McDonnell Boehnen Hulbert & Berghoff LLP

(57) ABSTRACT

An autonomous vehicle may be configured to receive, using a computer system, a plurality of remission signals from a portion of a lane of travel in an environment in response to at least one sensor of the vehicle sensing the portion of the lane of travel. A given remission signal of the plurality of remission signals may include a remission value indicative of a level of reflectiveness for the portion of the lane of travel. The vehicle may also be configured to compare the plurality of remission signals to a known remission value indicative of a level of reflectiveness for a lane marker in the lane of travel. Based on the comparison, the vehicle may additionally be configured to determine whether the portion of the lane of travel in the environment is indicative of a presence of the lane marker.

20 Claims, 7 Drawing Sheets

(56) References Cited

U.S. PATENT DOCUMENTS

| | | | |
|---|---|---|---|
| 8,412,449 B2 | 4/2013 | Trepagnier et al. | |
| 8,428,843 B2 | 4/2013 | Lee et al. | |
| 8,554,465 B2 * | 10/2013 | Schoenherr | B62D 15/027 340/932.2 |
| 8,577,534 B2 * | 11/2013 | Dorenkamp | G01S 7/40 180/167 |
| 8,605,998 B2 * | 12/2013 | Samples | G06K 9/00201 382/104 |
| 8,718,918 B2 * | 5/2014 | Roberts | B60W 30/16 340/436 |
| 8,825,259 B1 * | 9/2014 | Ferguson | G05D 1/0214 104/124 |
| 9,261,881 B1 * | 2/2016 | Ferguson | G05D 1/0236 |
| 2004/0104837 A1 * | 6/2004 | Samukawa | G01S 17/936 342/70 |
| 2005/0128133 A1 * | 6/2005 | Samukawa | G01S 17/936 342/70 |
| 2007/0280528 A1 * | 12/2007 | Wellington | G05D 1/0274 382/154 |
| 2010/0114416 A1 * | 5/2010 | Au | G01C 21/165 701/23 |
| 2012/0112076 A1 * | 5/2012 | Rosson | G01N 21/6402 250/361 R |
| 2012/0281907 A1 * | 11/2012 | Samples | G06K 9/00201 382/159 |
| 2012/0296567 A1 | 11/2012 | Breed | |
| 2014/0018994 A1 * | 1/2014 | Panzarella | G05D 1/0212 701/25 |
| 2014/0309806 A1 * | 10/2014 | Ricci | B60Q 1/00 701/1 |
| 2014/0310739 A1 * | 10/2014 | Ricci | H04W 48/04 725/28 |
| 2015/0232065 A1 * | 8/2015 | Ricci | B60R 25/01 701/36 |

FOREIGN PATENT DOCUMENTS

| | | | | |
|---|---|---|---|---|
| DE | WO 2009043788 A1 * | 4/2009 | | B66C 13/46 |
| DE | EP 2113437 A2 * | 11/2009 | | B62D 15/0265 |
| DE | 10 2007 046 288 B4 * | 4/2010 | | |
| EP | 2113437 A2 | 11/2009 | | |
| EP | 1358508 B1 | 2/2010 | | |
| GB | WO 03001472 A1 * | 1/2003 | | G01S 11/12 |
| GB | 0910730 | * 8/2009 | | B60W 40/072 |
| GB | 2471276 A | 12/2010 | | |
| WO | 03001472 A1 | 1/2003 | | |
| WO | 2009043788 A1 | 4/2009 | | |

* cited by examiner

FILTERING NOISY/HIGH-INTENSITY REGIONS IN LASER-BASED LANE MARKER DETECTION

CROSS-REFERENCE TO RELATED APPLICATION

The present application is a continuation of U.S. patent application Ser. No. 13/956,871, filed on Aug. 1, 2013, and entitled "Filtering Noisy/High-Intensity Regions in Laser-Based Lane Marker Detection," which is herein incorporated by reference as if fully set forth in this description.

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller adjusts the directional controls of the vehicle to cause the vehicle to navigate around the obstacle.

SUMMARY

Within examples, methods and systems are provided for filtering noisy or high-intensity regions in laser-based lane marker detection.

In a first aspect, a method is provided. The method may include receiving, using a processor, a plurality of remission signals based on a portion of a lane of travel in an environment in response to at least one sensor of a vehicle sensing the portion of the lane of travel. A given remission signal of the plurality of remission signals may include a remission value indicative of a level of reflectiveness for the portion of the lane of travel. The vehicle may be configured to operate in an autonomous mode in the environment and may be substantially in the lane of travel in the environment. The method may also include comparing the plurality of remission signals to a known remission value indicative of a level of reflectiveness for a lane marker in the lane of travel. The method may additionally include based on the comparison, determining whether the portion of the lane of travel in the environment is indicative of a presence of the lane marker.

In a second aspect, a vehicle is provided. The vehicle may include a sensor and a computer system. The sensor may be configured to sense a lane of travel in an environment of the vehicle. The vehicle may be configured to operate in an autonomous mode in the environment, and the vehicle may be substantially in the lane of travel in the environment. The computer system may be configured to receive a plurality of remission signals based on a portion of the lane of travel in the environment in response to the sensor sensing the portion of the lane of travel. The computer system may also be configured to compare the plurality of remission signals to a known remission value indicative of a level of reflectiveness for a lane marker in the lane of travel. The computer system may additionally be configured to, based on the comparison, determine whether the portion of the lane of travel in the environment is indicative of a presence of the lane marker.

In a third aspect, a non-transitory computer readable medium having stored therein instructions that when executed by a computer system in a vehicle, cause the computer system to perform functions is disclosed. The functions may include receiving a plurality of remission signals based on a portion of a lane of travel in an environment in response to at least one sensor of a vehicle sensing the portion of the lane of travel. A given remission signal of the plurality of remission signals may include a remission value indicative of a level of reflectiveness for the portion of the lane of travel. The vehicle may be configured to operate in an autonomous mode in the environment and may be substantially in the lane of travel in the environment. The functions may also include comparing the plurality of remission signals to a known remission value indicative of a level of reflectiveness for a lane marker in the lane of travel. The functions may additionally include, based on the comparison, determining whether the portion of the lane of travel in the environment is indicative of a presence of the lane marker.

In a fourth aspect a system is disclosed. The system may include a means for receiving a plurality of remission signals based on a portion of a lane of travel in an environment in response to at least one sensor of the vehicle sensing the portion of the lane of travel. A given remission signal of the plurality of remission signals may include a remission value indicative of a level of reflectiveness for the portion of the lane of travel. The vehicle may be configured to operate in an autonomous mode in the environment and may be substantially in the lane of travel in the environment. The system may also include a means for comparing the plurality of remission signals to a known remission value indicative of a level of reflectiveness for a lane marker in the lane of travel. The system may additionally include a means for based on the comparison, determining whether the portion of the lane of travel in the environment is indicative of a presence of the lane marker.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
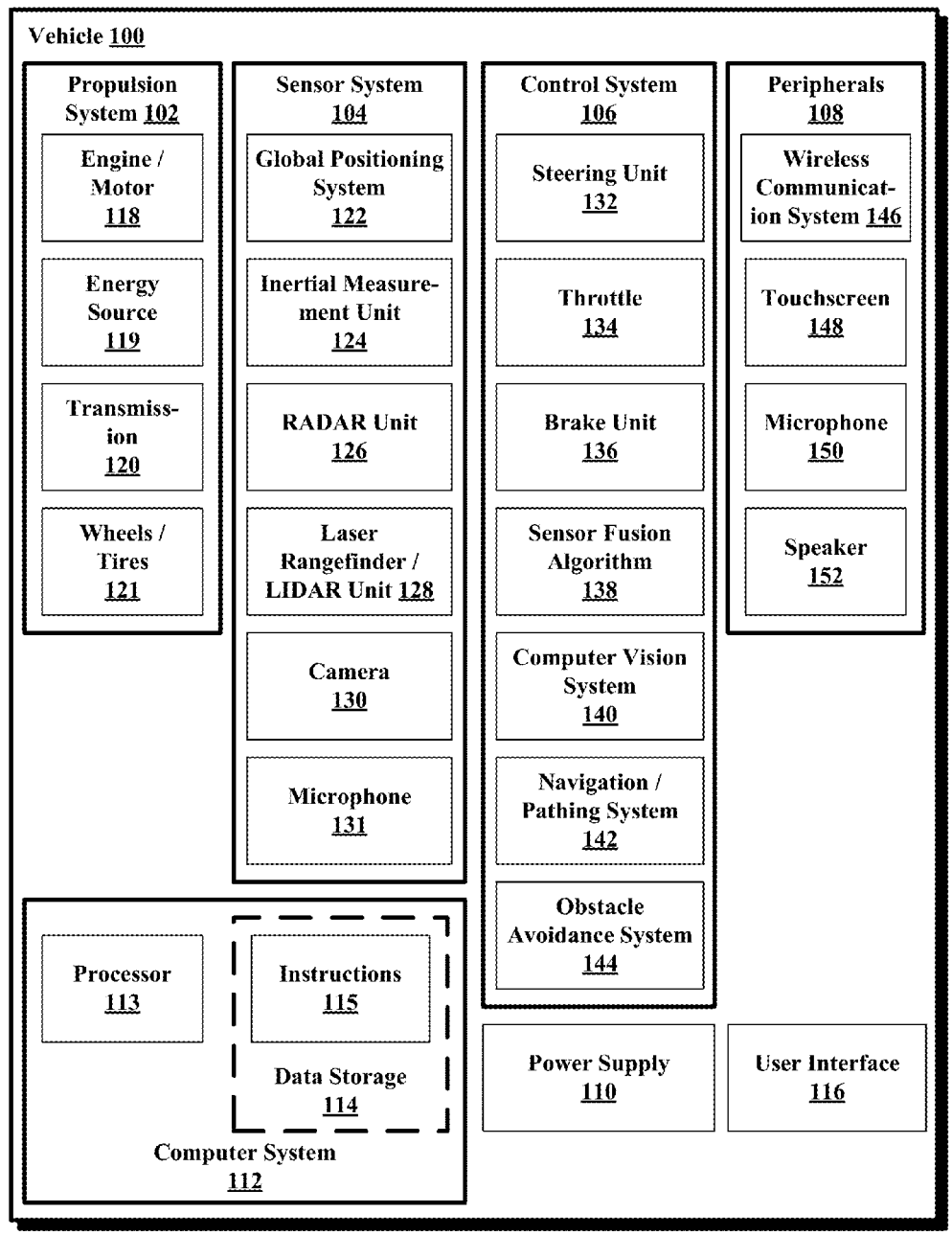
FIG. 1 is a functional block diagram illustrating a vehicle, in accordance with an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

For vehicles operating in an autonomous mode, sensing and detecting the markers that specify the boundaries of different traffic lanes may be important. Generally, to detect the markers and traffic lanes, an autonomous vehicle may utilize a laser imaging detection and radar (LIDAR) to periodically scan the lane in which the vehicle is operating and provide discriminating signals based on increased reflectance of the lane marker. For example, the vehicle may determine the presence of the lane markers because the lane markers may have higher remission signals than the remission signals produced by other portions of the lane. Based on the signals, the autonomous vehicle may differentiate between the lane and the lane markers and thereby determine the boundaries of the lane. However, LIDAR remission signals may generally be susceptible to signal noise, and therefore it may be difficult to separate the desired signal from the noise. Additionally, some regions in the lane may have higher remission signals than usual, which may make the lane remission signals indistinguishable to the lane marker remission signals.

Within examples, an autonomous vehicle is provided that is configured to filter out noise that may be associated with LIDAR remission signals generated when sensing a lane of travel, and filter out regions of the lane of travel that may generally have high remission signals. Disclosed herein are methods and systems that may allow an autonomous vehicle to separate signal noise from valid remission signals and to determine and recognize regions of a lane of travel that may produce high remission signals, but do not represent lane markers. Disclosed embodiments relate to an autonomous vehicle that may be configured to use a LIDAR to sense a particular lane of travel in an environment in which the vehicle is operating. Using the LIDAR to sense a portion of the lane, the vehicle may receive remission signals that may include remission values indicative of an amount of light that is received by the LIDAR when the LIDAR senses the portion of the lane. The vehicle may compare the values obtained from the remission signals to a known remission value that generally represents a level of reflectiveness for a lane marker. Based on the comparison, the vehicle may determine whether the portion of the lane of travel corresponds to the lane marker. Based on the determination, the vehicle may operate accordingly in the lane of travel (e.g., shift left or right to remain within the bounds of the lane marker).

Utilizing the methods and systems described herein may help an autonomous vehicle to more accurately use a LIDAR to sense and detect lane markers in a lane of travel. The methods and systems described herein may also be more widely acceptable to novel environments and may be used to address changing road conditions in a more robust manner.

Example systems will now be described in greater detail. Generally, an example system may be implemented in or may take the form of a computing device. However, an example system may also be implemented in or take the form of other devices or may be included within vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

FIG. 1 is a functional block diagram depicting a vehicle 100 according to an example embodiment. The vehicle 100 is configured to operate fully or partially in an autonomous mode, and thus may be referred to as an "autonomous vehicle." For example, a computer system 112 may control the vehicle 100 while in an autonomous mode via control instructions to a control system 106 for the vehicle 100. The computer system 112 may receive information from a sensor system 104, and base one or more control processes (such as the setting a heading so as to avoid a detected obstacle) upon the received information in an automated fashion.

The vehicle 100 may be fully autonomous or partially autonomous. In a partially autonomous vehicle some functions can optionally be manually controlled (e.g., by a driver) some or all of the time. Further, a partially autonomous vehicle may be configured to switch between a fully-manual operation mode and a partially-autonomous and/or a fully-autonomous operation mode.

The vehicle 100 may include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem may include multiple elements. Further, each of the subsystems and elements of vehicle 100 may be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion to the vehicle 100. Depending upon the embodiment, the propulsion system 102 may include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the propulsion system 102 may include multiple types of engines and/or motors. For instance, a gas-electric hybrid vehicle may include a gasoline engine and an electric motor. Other examples are possible as well.

The energy source 119 may represent a source of energy that may, in full or in part, power the engine/motor 118. That is, the engine/motor 118 may be configured to convert the energy source 119 into mechanical energy to operate the transmission 120. Examples of energy sources 119 may include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 may also provide energy for other systems of the automobile 100.

The transmission 120 may include elements that are operable to transmit mechanical power from the engine/motor 118 to the wheels/tires 121. Such elements may include a gearbox, a clutch, a differential, a drive shaft, and/or axle(s), etc. The transmission 120 may include other elements as well. The drive shafts may include one or more axles that may be coupled to the one or more wheels/tires 121.

The wheels/tires 121 may be arranged to stably support the vehicle 100 while providing frictional traction with a surface, such as a road, upon which the vehicle 100 moves. Accordingly, the wheels/tires 121 of vehicle 100 may be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 may represent at least one wheel that is fixedly attached to the transmission 120 and at least one tire coupled to a rim of the wheel that could make contact with the driving surface. The wheels/tires 121 may include any combination of metal and rubber, or another combination of materials.

The sensor system 104 generally includes one or more sensors configured to detect information about the environment surrounding the vehicle 100. For example, the sensor system 104 may include a Global Positioning System (GPS) 122, an inertial measurement unit (IMU) 124, a RADAR unit 126, a laser rangefinder/LIDAR unit 128, a camera 130, and/or a microphone 131. The sensor system 104 may also include sensors configured to monitor internal systems of the vehicle 100 (e.g., $O_2$ monitor, fuel gauge, engine oil temperature, wheel speed sensors, etc.). One or more of the sensors included in the sensor system 104 may be configured to be actuated separately and/or collectively in order to modify a position and/or an orientation of the one or more sensors.

The GPS 122 may be any sensor configured to estimate a geographic location of the vehicle 100. To this end, GPS 122 may include a transceiver operable to provide information regarding the position of the vehicle 100 with respect to the Earth.

The IMU 124 may include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the vehicle 100 is located using lasers. Depending upon the embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 may include one or more devices configured to capture a plurality of images of the environment surrounding the vehicle 100. The camera 130 may be a still camera or a video camera. In some embodiments, the camera 130 may be mechanically movable such as by rotating and/or tilting a platform to which the camera is mounted. As such, a control process of the vehicle 100 may be implemented to control the movement of the camera 130.

The sensor system 104 may also include a microphone 131. The microphone 131 may be configured to capture sound from the environment surrounding the vehicle 100. In some cases, multiple microphones can be arranged as a microphone array, or possibly as multiple microphone arrays.

The control system 106 may be configured to control operation(s) of the vehicle 100 and its components. Accordingly, the control system 106 may include various elements include steering unit 132, throttle 134, brake unit 136, a sensor fusion algorithm 138, a computer vision system 140, a navigation/pathing system 142, and an obstacle avoidance system 144, etc.

The steering unit 132 may represent any combination of mechanisms that may be operable to adjust the heading of vehicle 100. For example, the steering unit 132 can adjust the axis (or axes) of one or more of the wheels/tires 121 so as to effect turning of the vehicle 100. The throttle 134 may be configured to control, for instance, the operating speed of the engine/motor 118 and, in turn, control the speed of the vehicle 100. The brake unit 136 may include any combination of mechanisms configured to decelerate the vehicle 100. The brake unit 136 may, for example, use friction to slow the wheels/tires 121. In other embodiments, the brake unit 136 inductively decelerates the wheels/tires 121 by a regenerative braking process to convert kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 may include, for instance, a Kalman filter, Bayesian network, or other algorithm. The sensor fusion algorithm 138 may provide various assessments based on the data from sensor system 104. Depending upon the embodiment, the assessments may include evaluations of individual objects and/or features in the environment of vehicle 100, evaluations of particular situations, and/or evaluations of possible impacts based on the particular situation. Other assessments are possible.

The computer vision system 140 may be any system operable to process and analyze images captured by camera 130 in order to identify objects and/or features in the environment of vehicle 100 that could include traffic signals, road way boundaries, other vehicles, pedestrians, and/or obstacles, etc. The computer vision system 140 may use an object recognition algorithm, a Structure From Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path for the vehicle 100. For example, the navigation/pathing system 142 may determine a series of speeds and directional headings to effect movement of the vehicle 100 along a path that substantially avoids perceived obstacles while generally advancing the vehicle 100 along a roadway-based path leading to an ultimate destination, which may be set according to user inputs via the user interface 116, for example. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 may represent a control system configured to identify, evaluate, and avoid or otherwise negotiate potential obstacles in the environment of the vehicle 100. For example, the obstacle avoidance system 144 may effect changes in the navigation of the vehicle 100 by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 may be configured such that a swerving maneuver is not undertaken when other sensor systems detect vehicles, construction barriers, other obstacles, etc. in the region adjacent the vehicle 100 that would be swerved into. In some embodiments, the obstacle avoidance system 144 may automatically select the maneuver that is both available and maximizes safety of occupants of the vehicle. For example, the obstacle avoidance system 144 may select an avoidance maneuver predicted to cause the least amount of acceleration in a passenger cabin of the vehicle 100.

The control system 106 may additionally or alternatively include components other than those shown and described.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. may include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of the vehicle 100, and convey information from the user indicated via the touchscreen 148 to the user interface 116. The touchscreen 148 can be configured to sense both touch positions and touch gestures from the finger of a user (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from an occupant of the vehicle 100. Similarly, the speaker 152 can be configured to output audio to the occupant of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle 100 that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, the wireless communication system 146 can communicate with a wireless local area network (WLAN), for example, using WiFi. In some embodiments, the wireless communication system 146 could communicate directly with a device, for example, using an infrared link, Bluetooth, and/or ZigBee. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

The power supply 110 may provide power to components of the vehicle 100, such as electronics in the peripherals 108, the computer system 112, the sensor system 104, etc. The power supply 110 can include a rechargeable lithium-ion or lead-acid battery for storing and discharging electrical energy to the various powered components, for example. In some embodiments, one or more banks of batteries may be configured to provide electrical power. In some embodiments, the power supply 110 and the energy source 119 can be implemented together, as in some all-electric cars.

Many or all of the functions of the vehicle 100 may be controlled via the computer system 112 that receives inputs from the sensor system 104, the peripherals 108, etc., and communicates appropriate control signals to the propulsion system 102, the control system 106, the peripherals 108, etc. to effect automatic operation of the vehicle 100 based on its surroundings. The computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various automobile functions, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100, and associated computer system 112, provides information to and/or receives input from, a user of the vehicle 100, such as an occupant in a passenger cabin of the vehicle 100. Accordingly, the vehicle 100 may include a user interface 116 for providing information to or receiving input from a user of vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 may utilize input from the control system 106 to control the steering unit 132 to avoid an obstacle detected by the sensor system 104 and the obstacle avoidance system 144. The computer system 112 may be configured to control many aspects of the vehicle 100 and its subsystems. Generally, however, provisions are made for manually overriding automated controller-driven operation, such as in the event of an emergency, or merely in response to a user-activated override, etc.

The components of the vehicle 100 described herein may be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in the data storage 114, and/or by other techniques.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 may generally be communicatively coupled together in a wired and/or wireless fashion.

Figure 2:
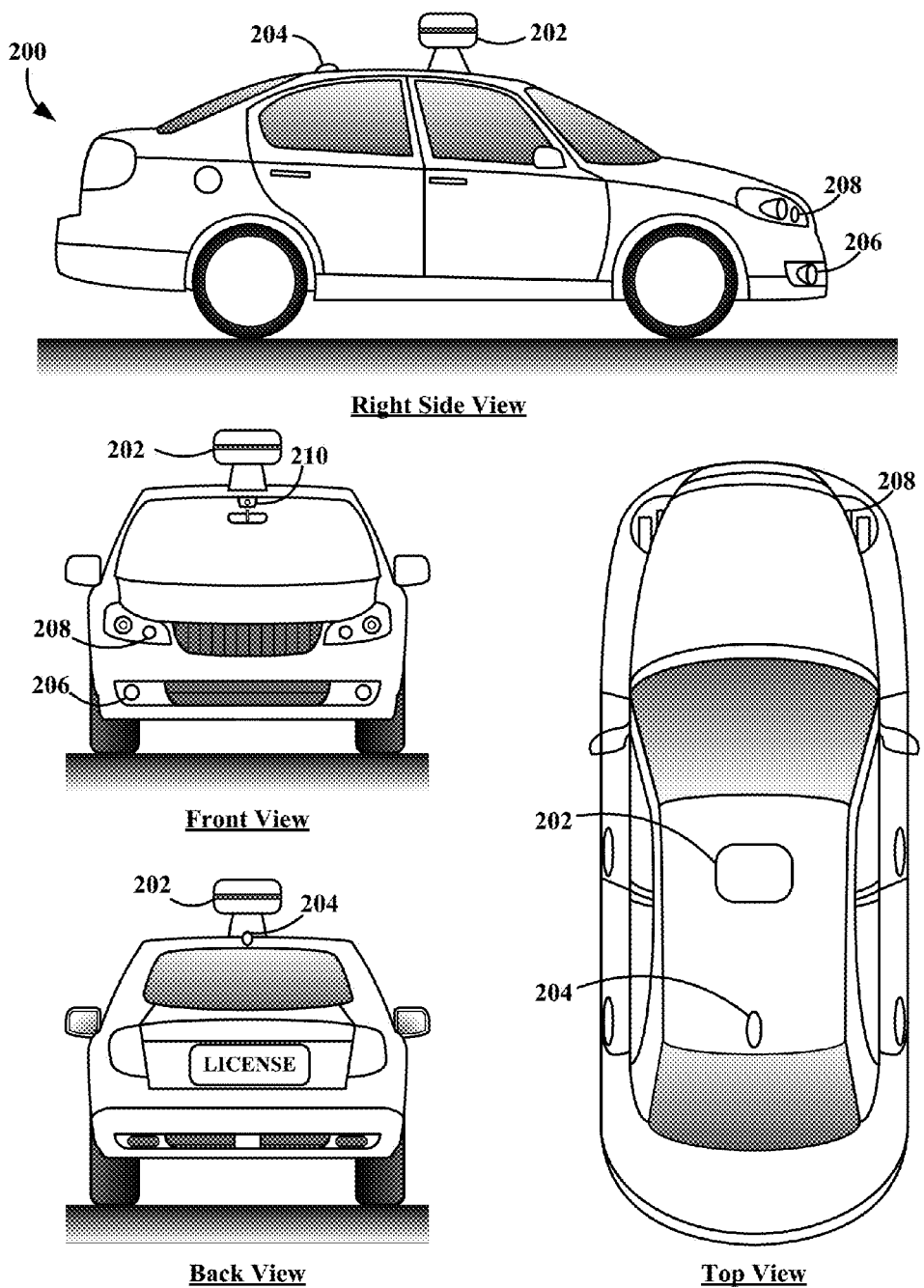
FIG. 2 is a vehicle, in accordance with an example embodiment.

FIG. 2 depicts an example vehicle 200 that can include all or most of the functions described in connection with the vehicle 100 in reference to FIG. 1. Although example vehicle 200 is illustrated in FIG. 2 as a four-wheel sedan-type car for illustrative purposes, the present disclosure is not so limited. For instance, example vehicle 200 can represent any type of vehicle mentioned herein.

Example vehicle 200 includes a sensor unit 202, a wireless communication system 204, a LIDAR unit 206, a laser rangefinder unit 208, and a camera 210. Furthermore, example vehicle 200 may include any of the components described in connection with vehicle 100 of FIG. 1.

The sensor unit 202 is mounted atop example vehicle 200 and includes one or more sensors configured to detect information about an environment surrounding example vehicle 200, and output indications of the information. For example, the sensor unit 202 may include any combination of cameras, RADARs, LIDARs, range finders, and acoustic sensors. The sensor unit 202 may include one or more movable mounts that may be operable to adjust the orientation of one or more sensors in the sensor unit 202. In one embodiment, the movable mount may include a rotating platform that may scan sensors so as to obtain information from each direction around example vehicle 200. In another embodiment, the movable mount of the sensor unit 202 may be moveable in a scanning fashion within a particular range of angles and/or azimuths. The sensor unit 202 may be mounted atop the roof of a car, for instance, however other mounting locations are possible. Additionally, the sensors of the sensor unit 202 may be distributed in different locations and need not be collocated in a single location. Some possible sensor types and mounting locations include the LIDAR unit 206 and laser rangefinder unit 208. Furthermore, each sensor of the sensor unit 202 may be configured to be moved or scanned independently of other sensors of the sensor unit 202.

The wireless communication system 204 may be located on a roof of example vehicle 200 as depicted in FIG. 2. Alternatively, the wireless communication system 204 may be located, fully or in part, elsewhere. The wireless communication system 204 may include wireless transmitters and receivers that may be configured to communicate with devices external or internal to example vehicle 200. Specifically, the wireless communication system 204 may include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be a photo-sensitive instrument, such as a still camera, a video camera, etc., that is configured to capture a plurality of images of the environment of example vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 may provide range information by using a structured light technique in which example vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, example vehicle 200 may determine the distance to the points on the object. The predetermined light pattern may comprise infrared light, or radiation at other suitable wavelengths for such measurements.

The camera 210 may be mounted inside a front windshield of example vehicle 200. Specifically, the camera 210 may be situated to capture images from a forward-looking view with respect to the orientation of example vehicle 200. Other mounting locations and viewing angles of the camera 210 may also be used, either inside or outside example vehicle 200.

The camera 210 can have associated optics operable to provide an adjustable field of view. Further, the camera 210 may be mounted to example vehicle 200 with a movable mount to vary a pointing angle of the camera 210, such as a via a pan/tilt mechanism.

Figure 3A:
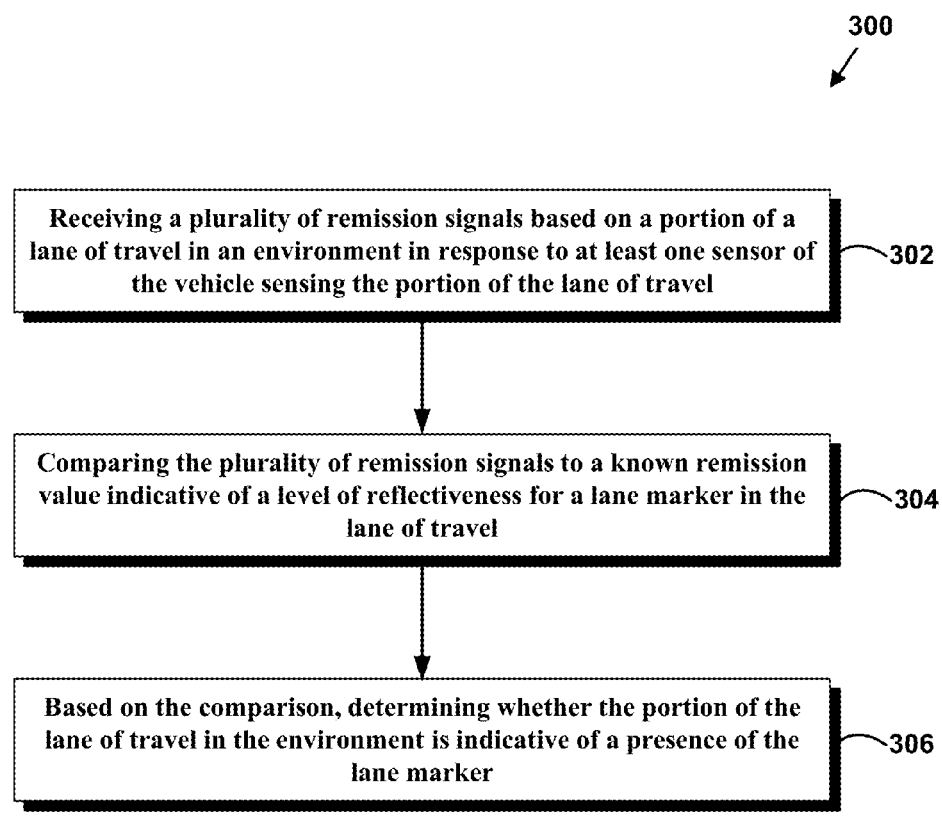
FIG. 3A illustrates a block diagram of a method, in accordance with an example embodiment.

In FIG. 3A, a method 300 is provided for filtering noisy or high-intensity regions in laser-based lane marker detection. The vehicle described in this method may be vehicle 100 and/or vehicle 200 as illustrated and described in reference to FIGS. 1 and 2, respectively, or components of the vehicle 100 or vehicle 200. For example, the processes described herein may be carried out by RADAR unit 126, LIDAR unit 128, and/or camera 130 mounted to an autonomous vehicle (e.g., vehicle 200) in communication with computer system 112, sensor fusion algorithm 138, and/or computer vision system 140.

Furthermore, it is noted that the functionality described in connection with the flowcharts described herein can be implemented as special-function and/or configured general-function hardware modules, portions of program code executed by a processor (e.g., the processor 113 in the computer system 112) for achieving specific logical functions, determinations, and/or steps described in connection with the flowchart shown in FIG. 3A (or FIG. 3B). Where used, program code can be stored on any type of computer-readable medium (e.g., computer-readable storage medium or non-transitory media, such as the data storage 114 described above with respect to computer system 112 and/or a computer program product 500 described below), for example, such as a storage device including a disk or hard drive.

In addition, each block of the flowchart shown in FIG. 3A (or FIG. 3B) may represent circuitry that is wired to perform the specific logical functions in the process. Unless specifically indicated, functions in the flowchart shown in FIGS. 3A-3B may be executed out of order from that shown or discussed, including substantially concurrent execution of separately described functions, or even in reverse order in some examples, depending on the functionality involved, so long as the overall functionality of the described method is maintained. Furthermore, similar combinations of hardware and/or software elements can be employed to implement the methods described in connection with other flowcharts provided in the present disclosure, such as the additional flowchart shown in FIG. 3B.

Initially at block 302, method 300 of FIG. 3A includes receiving a plurality of remission signals based on a portion of a lane of travel in an environment in response to at least one sensor of the vehicle sensing the portion of the lane of travel. As previously noted, the vehicle may be the vehicle described in reference to FIGS. 1 and 2 may be configured to operate in an autonomous mode in the environment. The environment may be any environment in which the vehicle may be operating autonomously on a surface with a lane of travel. The vehicle may be operating and/or positioned substantially in the lane of travel.

The surface may include any type of surface or medium that a vehicle may travel upon. For example, some surfaces may represent a road of some type including, for example, a highway or an interstate to name a few. In other examples, the surface may represent other mediums of travel including water or air. The sensor may be a LIDAR the same as or similar to the LIDAR described with reference to LIDAR Unit 128 of FIG. 1.

The remission signals may include a plurality of laser data points that are based on objects in the environment of the vehicle, and more specifically, data points that are based on lane markers in the portion of the lane of travel in the environment. Vehicle components such as a computing device or processor may be configured to receive the remission signals. For example, the vehicle may have a LIDAR unit that illuminates areas around, surrounding, in front of, behind, to the side, or in any proximity or relation to the vehicle, and detects reflected light. In some cases of operation, the LIDAR may rotate (e.g., periodically) and emit laser beams. Other motions may be taken by the LIDAR as well.

An autonomous vehicle may utilize a large number of scans or periodic scans to establish successive scans. Successive scans may be multiple scans by the LIDAR unit occurring over time and may be continuous or may occur in intervals. Other examples of successive scans may exist as well. Reflections from the emitted laser beams by lane markers in the lane of travel of the environment may then be received as remission signals by suitable sensors.

Time-stamping receipt of the reflected signals may allow for associating each reflected signal (if any is received at all) with the most recently emitted laser pulse, and measuring the time delay between emission of the laser pulse and reception of the reflected light. The time delay may provide an estimate of the distance to the reflective feature by scaling according to the speed of light in the intervening atmosphere. Combining the distance information for each reflected signal with the orientation of the LIDAR device for the respective pulse emission may allow for determining a position of the reflective feature in three-dimensions. For illustrative purposes, an environmental scene can be described in the two-dimensional x-y plane in connection with a single sweep of the LIDAR device that estimates positions to a series of points located in the x-y plane. However, it is noted that a more complete three-dimensional sampling is provided by either adjusting beam steering optics to direct the laser beam up or down from the x-y plane on its next sweep of the scene or by providing additional lasers and associated beam steering optics dedicated to sampling point locations in planes above and below the x-y plane, or combinations of these.

A computing device of a vehicle may be configured to store the successive scans in various types of memory. The computing device may capture successive scans in intervals or may be executed simultaneously. Other examples of accumulating successive scans may exist as well. Accordingly, as a vehicle continues to operate in a lane of travel, successive scans by a LIDAR unit may provide returns that show the reflectiveness of a detected portion of the lane of travel.

Block 304 includes comparing the plurality of remission signals to a known remission value indicative of a level of reflectiveness for a lane marker in (or associated with) the lane of travel. The comparison may be made to determine whether the remission signals obtained at block 302 are indicative of the lane marker. To do so, a computing device of a vehicle may determine whether the level of reflectiveness of the plurality of remission signals matches or is equivalent to a generally known level of reflectiveness for a lane marker by comparing the two reflectiveness values. In other words, the vehicle may compare the reflectivity of received remission signals to a threshold reflectiveness that represents the reflectivity of the lane marker known at that time.

In other examples, the computing device may determine that the remission signals obtained at block 302 are indicative of the lane marker level of reflectiveness based on the level of reflectiveness of the plurality of remission signals being within a certain range of the generally known level of reflectiveness.

The generally known level of reflectiveness for a lane marker may be known by the vehicle (e.g., stored in a data storage the same as or similar to data storage 114 of a computer system similar to or the same as computer system 112) prior to the vehicle scanning the lane of travel for lane markers. For example, the vehicle may maintain a data base (e.g., using data storage 114) that includes statistics on the recent distribution of LIDAR remission values obtained by the vehicle, as well as statistics on the level of reflectivity for lane markers that have recently been reported. In other examples, the known level of reflectiveness may be received from a server or database external to the vehicle as the vehicle operates in the environment and the comparison may be made in real time.

To make the comparison, in some examples, the vehicle may use its components (e.g., a computer system) and determine an average remission value based on respective remission signals of the plurality of remission signals. In other words, the vehicle may determine an average remission value based on each remission signal of the plurality of remission signals that may be indicative of an average level of reflectiveness for the portion of the lane of travel. Using the average remission value, the vehicle may compare it to the generally known remission value indicative of a level of reflectiveness for the lane markers on the road upon which the vehicle is traveling. In other examples, the vehicle may use its components (e.g., a computer system) and determine a variance based on the average remission signals and respective remission signals of the plurality of remission signals. Thereafter variance may be used during the comparison to, for example, categorize respective remission signals (e.g., high reflectivity, low reflectivity, average reflectivity).

At block 306, method 300 includes based on the comparison, determining whether the portion of the lane of travel in the environment is indicative of a presence of the lane marker. To make the determination, a computing device may be configured to compare the reflectiveness of the portion to a threshold level of reflectiveness indicative of a lane marker in the manner indicated above at block 304. In examples in which an average remission value is determined, the vehicle may determine the portion of the lane of travel in the environment is indicative of the presence of the lane marker based on the average remission value being equivalent to or within a range of the generally known remission value. Alternatively, the vehicle may determine the portion of the lane of travel in the environment is not indicative of the presence of the lane marker based on the average remission value not being equivalent to or being outside a range of the generally known remission value.

In some examples, after the determination has been made, the vehicle may be provided with instructions to control the vehicle in the autonomous mode. For example, once the vehicle has determined the location of one or more lane markers, instructions may be provided to the vehicle to remain within the lane markers and thereby remain within the lane. The vehicle may be provided with other similar operating instructions as well.

Further, in some examples, once the presence of a lane marker has been determined the vehicle may be provided instructions to use information surrounding the located lane marker to determine the location of other lane markers. For example, a computing device of the vehicle may be configured to utilize the relative position of that lane marker to determine other lane markers. The computing device may utilize information received from other sensors such as a RADAR or GPS, in addition to the information provided by the LIDAR unit to determine the presence of other lane markers that may be present in the lane of travel.

Figure 4:
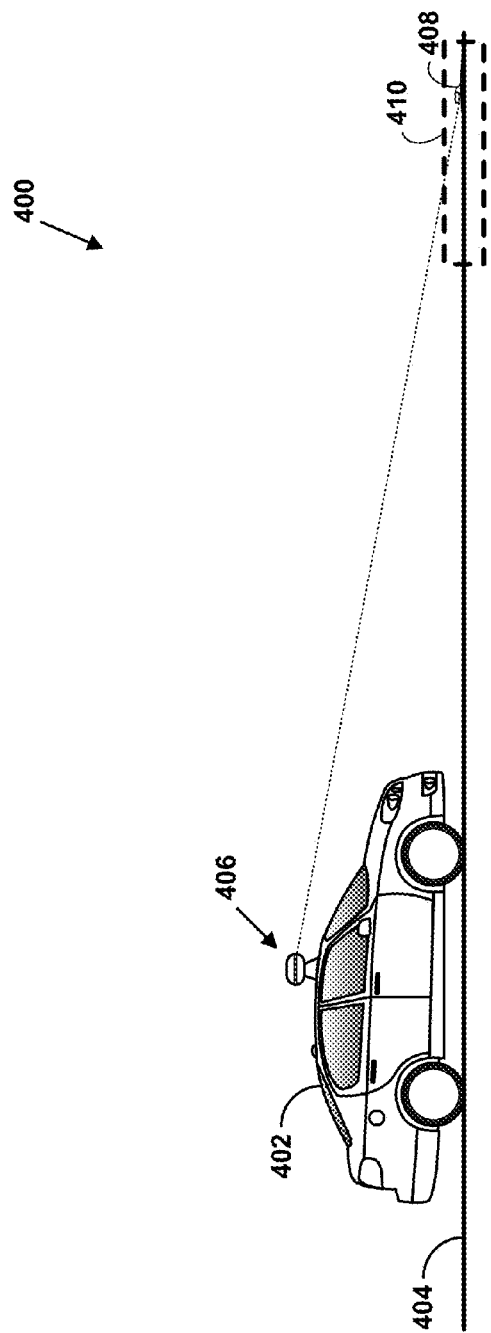
FIG. 4 is a conceptual side view illustration of filtering noisy or high-intensity regions in laser-based lane marker detection, in accordance with an example embodiment.

FIG. 4 is a conceptual side view illustration of example detection of a lane marker (or reflective marker) in a lane of travel, in accordance with at least some embodiments described herein. In FIG. 4, an autonomous vehicle 402 is travelling in environment 400 substantially in lane of travel 404 with a lane marker 408 on the surface in front of the vehicle 402. Autonomous vehicle 402 may include a LIDAR unit 406 that may be configured to receive laser data collected for a portion 410 of lane of travel 404 and in front of the vehicle 402. The autonomous vehicle 402 may travel in lane of travel 404 and utilize the LIDAR unit 406 to detect lane markers and other objects, such as lane marker 408. Lane marker 408 may, for example, be detected by LIDAR unit 406 when laser beams are reflected by the lane marker.

In other examples (not shown in FIG. 4) the autonomous vehicle 402 may be replaced by other types of vehicles, including vehicle 100 shown in FIG. 1 and vehicle 200 shown in FIG. 2. The autonomous vehicle may be capable of being driven by a driver or by a computing device. The autonomous vehicle 402 may be traveling towards the lane marker 408 at any speed.

As noted above with regard to block 302 of method 300, surface 404 shown in FIG. 4 may represent any type of surface or medium that a vehicle may travel upon. In the example, the surface 404 may represent a road of some type. In other examples, the surface 404 may represent other mediums of travel, including water or air. For example, a boat may be traveling in water and need to identify reflective markers at a long range away from the boat. The lane marker 408 shown within the example may be a reflective lane marker, a cat eye, or another reflective entity that may help demarcate lane of travel 404.

The autonomous vehicle 402 shown in the example illustrated by FIG. 4 also includes a LIDAR unit 406 attached to the front of the vehicle. In other implementations, the LIDAR unit may be coupled to other portions of the vehicle. Further, a vehicle may include additional LIDAR units. The LIDAR unit 406 may be configured to scan for lane markers in any range. For example, a vehicle may be configured to include a long range LIDAR unit and a short range LIDAR unit that are each calibrated to focus upon certain ranges in front of the vehicle. The various ranges LIDAR units may be capable of being programmed by a computing device in real-time.

In the example shown by FIG. 4, the LIDAR unit 406 is actively scanning in front of the vehicle 402 in portion 410 for any lane markers, including detected lane marker 408. As the vehicle 402 travels towards the lane marker 408, LIDAR unit 406 may detect the portion of the lane 404 in successive scans. In the successive scans, the lane marker 408 may initially return a certain remission signal reflectivity level, but the reflectivity level may change as the vehicle continues to scan the portion. A computing device may utilize the information obtained from the successive scans by the LIDAR unit to determine that some of the reflectivity received during the successive scans is evident that the portion of the lane of travel contains a lane marker.

Referring back to FIG. 3B, provided is another method 320 for filtering noisy or high-intensity regions in laser-based lane marker detection. Similar to method 300 of FIG. 3A, the vehicle described in this method may be vehicle 100 and/or vehicle 200 as illustrated and described in reference to FIGS. 1 and 2, respectively, or components of the vehicle 100 or vehicle 200. Method 320 may be performed in addition to, at the same time, or subsequently to method of 300 of FIG. 3A.

Initially at block 322, method 320 includes receiving a second plurality of remission signals based on a second portion of the lane of travel in the environment. The second portion of lane of travel may be different than the first portion of the lane of travel in the environment, and consequently, the second plurality of remission signals from the second portion of the lane of travel in the environment may be different than the plurality of remission signals received at block 302 of method 300. The second plurality of remission signals may be received in a manner the same as or similar to that described in reference to block 302 of method 300.

At block 324, method 320 includes determining a region of the lane of travel. The region of the lane of travel may include the first portion of the lane of travel and the second portion of the lane of travel. Regions of the lane of travel may be determined based on transitions such as a lane of travel that transitions from a flat road to a hilly road or a lane of travel that transitions from uncovered road to road in a tunnel or under a bridge, for example. Other transitions are possible as well. For example, a vehicle may determine based on the angle of incidence of an operating LIDAR sensor that it is transitioning from a flat road to a road with a hill portion. Regions may be determined in other manners as well. In some examples, the region may be determined randomly.

Block 326 includes determining an average remission value based on respective remission signals of the plurality of remission signals and respective remission signals of the second plurality of remission signals. The average remission value may be determined in a manner the same as or similar to the average remission value described above in reference to block 304 of method 300.

At block 328, method 320 includes comparing the average remission value to the known remission value. The average remission value may be compared to the generally known remission value in a manner similar to or the same as that described above in reference to block 304 of method 300.

Block 330 includes, based on the average remission value being greater than the known remission value, causing the known remission value to be changed in a manner such that the known remission value is greater than the average remission value for the region. For example, if the average of the remission values returned over a region of the road the vehicle is traveling on begins to dramatically or substantially increase, maybe due to brighter pavement or one of the transitions noted above, the remission threshold necessary to be considered a lane marker may be increased. In some examples, the threshold may be set based on or as a function of the average threshold and the variance of the plurality of remission signals (described above in regard to block 304 of method 300). Thereafter, as the vehicle continues to operate in the region, detect and compare lane markers, the vehicle may utilize the updated known remission value (i.e., threshold) instead of the previously known (or outdated) remission value to determine the presence of lane markers.

In other examples (not shown in method 320), when the number of detected lane markers (based on the remission threshold necessary to be considered a lane marker) increases above a certain value, it may be indicative that the threshold may be set too low (e.g., immediately after a change in pavement type from darker to brighter). In this situation, the remission threshold necessary to be considered a lane marker may be temporarily increased even higher in order to limit false positive detections.

Figure 5:
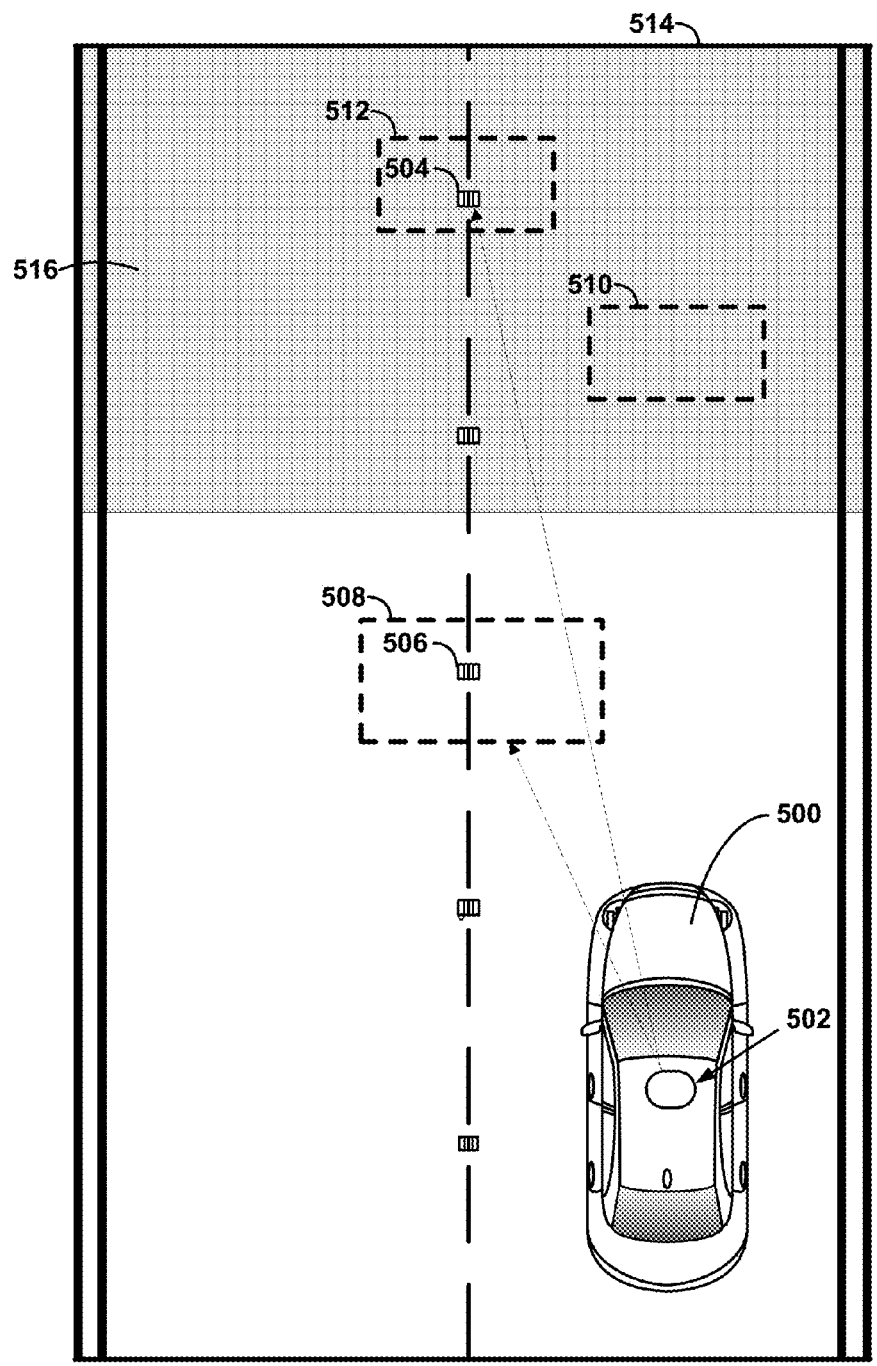
FIG. 5 is another conceptual side view illustration of filtering noisy or high-intensity regions in laser-based lane marker detection, in accordance with an example embodiment.

FIG. 5 is a conceptual illustration of another example detection of a lane marker (or reflective marker) in a lane of travel. FIG. 5 illustrates an aerial view of a vehicle that is detecting lane markers at various distances away from the vehicle and in different portions of a lane of travel. Within the example conceptual illustration, FIG. 5 includes a vehicle 500 with a LIDAR unit 502 for detecting lane markers such as lane markers 504 and 506.

Similar to FIG. 4, the vehicle 500 may be replaced by any type of vehicle, including vehicle 100 illustrated in FIG. 1 and vehicle 200 illustrated in FIG. 2. The vehicle 500 may operate autonomously or may be controlled by a driver. Vehicle 500 may include a LIDAR unit 502 that operates to receive laser data from various portions of lane of travel 512 of which vehicle 500 is operating and substantially positioned in the lane of travel. The LIDAR unit 502 may be placed at different points of the vehicle 500. In the example, the LIDAR unit 502 is positioned on the top of the vehicle 500. Furthermore, the vehicle 500 may include additional LIDAR units. The lane markers 504 and 506 shown in the example represent lane markers or cat eyes. In other examples, the lane markers 504 and 506 may represent similar reflective materials that indicate position on a road.

In the example, the vehicle 500 may be traveling along the road and utilizing sensors, such as LIDAR unit 502 to identify lane markers that may define the path which vehicle 500 is traveling along. To do so, vehicle 500 may scan portion 508 of lane of travel 514 using LIDAR unit 502. A computing device associated with the vehicle 500 may determine that the objects in the center of portion 508 are a lane marker 506. Using the methods described above, the computing device may receive LIDAR scans to determine that the entities are lane markers.

As vehicle 500 continues to operate in lane of travel 514, vehicle 500 may scan different portions 510 and 512 of lane of travel 514. Based on the LIDAR scans received by the computing device of vehicle 500, vehicle 500 may determine that the pavement of lane of travel 514 has become brighter in those areas (indicated in FIG. 5 by the gray area). In the example, portions 510 and 512 may be included in region 516. Accordingly, to recognize lane markers, in region 516, vehicle 500 may update or change its threshold level of reflectiveness for a lane marker. Thereafter, as vehicle 500 operates in region 516, vehicle 500 may use the updated (in this example higher) threshold when determining the presence of lane markers.

Figure 3B:
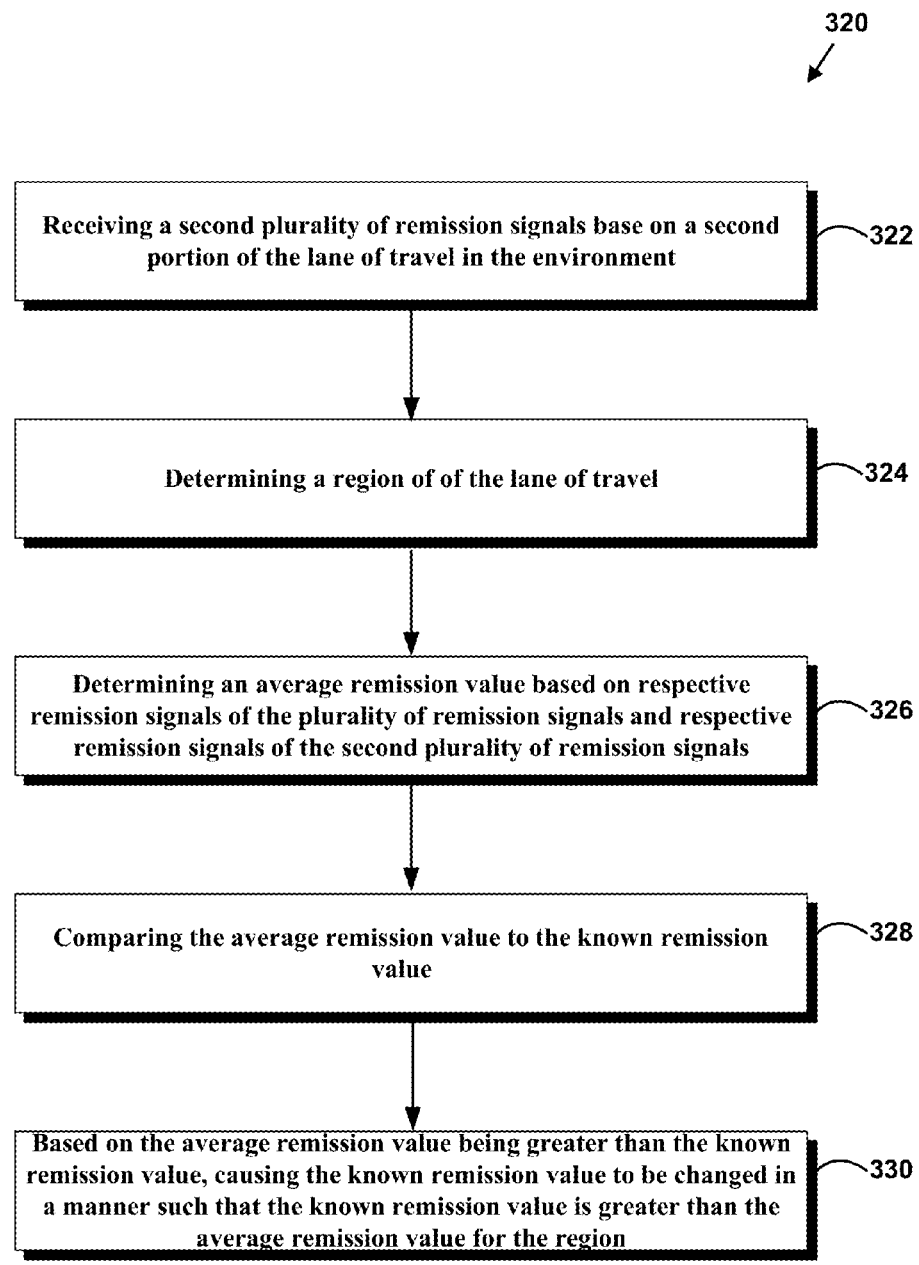
FIG. 3B illustrates another block diagram of a method, in accordance with an example embodiment.

Example methods, such as method 300 of FIG. 3A or method 320 of FIG. 3B may be carried out in whole or in part by the vehicle and its subsystems. Accordingly, example methods could be described by way of example herein as being implemented by the vehicle. However, it should be understood that an example method may be implemented in whole or in part by other computing devices. For example, an example method may be implemented in whole or in part by a server system, which receives data from a device such as those associated with the vehicle. Other examples of computing devices or combinations of computing devices that can implement an example method are possible.

Figure 6:
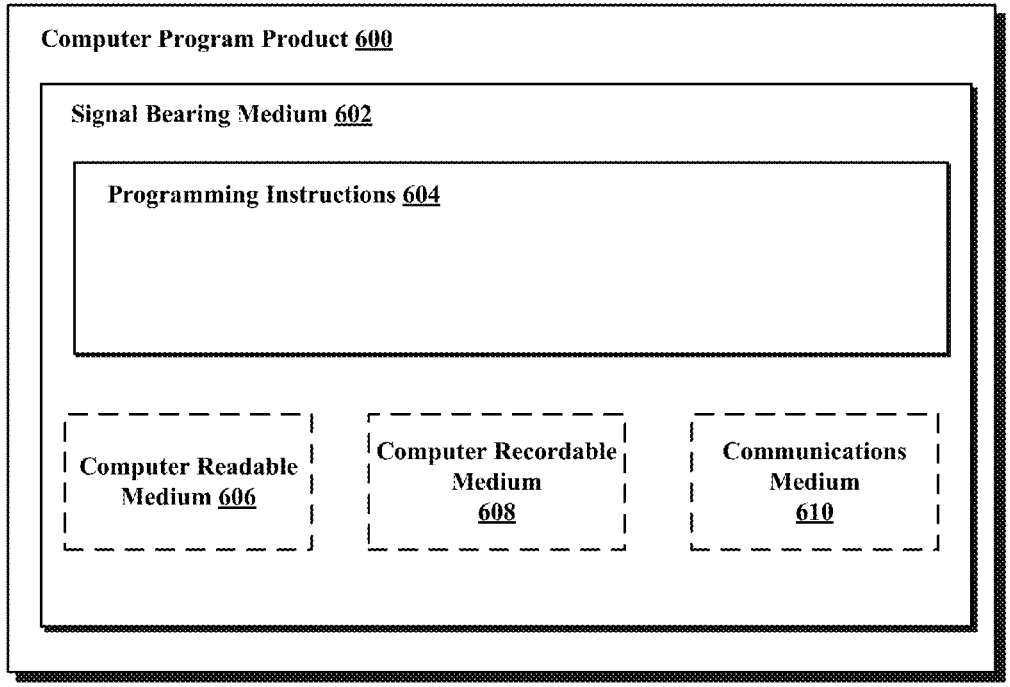
FIG. 6 is a schematic diagram of a computer program product, according to an example embodiment.

In some embodiments, the techniques disclosed herein may be implemented as computer program instructions encoded on a non-transitory computer-readable storage media in a machine-readable format, or on other non-transitory media or articles of manufacture (e.g., the instructions 115 stored on the data storage 114 of the computer system 112 of the vehicle 100). FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 602. The signal bearing medium 602 may include one or more programming instructions 604 that, when executed by one or more processors may provide functionality or portions of the functionality described herein. In some examples, the signal bearing medium 602 can be a non-transitory computer-readable medium 606, such as, but not limited to, a hard disk drive, a Compact Disc (CD), a Digital Video Disk (DVD), a digital tape, memory, etc. In some implementations, the signal bearing medium 602 may encompass a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the signal bearing medium 602 may be conveyed by a wireless form of the communications medium 610.

The one or more programming instructions 604 may be, for example, computer executable and/or logic implemented instructions. In some examples, a computing device such as the computer system 112 of FIG. 1 may be configured to provide various operations, functions, or actions in response to the programming instructions 604 conveyed to the computer system 112 by one or more of the computer readable medium 606, the computer recordable medium 608, and/or the communications medium 610.

The non-transitory computer readable medium could also be distributed among multiple data storage elements, which could be remotely located from each other. The computing device that executes some or all of the stored instructions could be a vehicle, such as the example vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments are possible. The various aspects and embodiments disclosed herein are for purposes of illustration and are not intended to be limiting, with the true scope being indicated by the following claims.

We claim:

1. A method comprising:

receiving, by one or more processors, from at least one sensor of an autonomous vehicle, a plurality of remission signals based on a portion of a lane of travel in an environment, wherein a given remission signal of the plurality of remission signals comprises a respective remission value indicative of a level of reflectiveness for the portion of the lane of travel, wherein the autonomous vehicle is substantially in the lane of travel in the environment;

determining, by the one or more processors, an average remission value based on respective remission signals of the plurality of remission signals, wherein the average remission value is indicative of an average level of reflectiveness for the portion of the lane of travel;

comparing, by the one or more processors, the average remission value to a known remission threshold indicative of a minimum level of reflectiveness for a lane marker in the lane of travel;

based on the comparison, the one or more processors adjusting the known remission threshold to be an adjusted known remission threshold, wherein the adjusted remission threshold is used for only a predetermined period of time as the autonomous vehicle navigates in the lane of travel; and responsive to the adjusting, the one or more processors (i) determining, based on the adjusted known remission threshold, that the portion of the lane of travel includes at least one lane marker demarcating the lane of travel, and (ii) controlling the autonomous vehicle to navigate the lane of travel within the determined at least one lane marker demarcating the lane of travel.

2. The method of claim 1, wherein determining that the portion of the lane of travel includes the at least one lane marker demarcating the lane of travel based on the adjusted known remission threshold comprises:

comparing the plurality of remission signals to the adjusted known remission threshold; and based on the comparison of the plurality of remission signals to the adjusted known remission threshold, determining that the portion of the lane of travel includes at least one lane marker demarcating the lane of travel.

3. The method of claim 1, wherein adjusting the known remission threshold to be an adjusted known remission threshold based on the comparison comprises:

based on the comparison indicating that the average remission value is greater than the known remission threshold, the one or more processors adjusting the known remission threshold to be higher such that the adjusted known remission threshold is greater than the average remission value.

4. The method of claim 1, wherein adjusting the known remission threshold to be an adjusted known remission threshold based on the comparison comprises:

based on the comparison indicating that the average remission value is less than the known remission threshold, the one or more processors adjusting the known remission threshold to be lower such that the adjusted known remission threshold is less than the average remission value.

5. The method of claim 1, wherein the predetermined period of time is a period of time during which at least a portion of the autonomous vehicle travels past the portion of the lane of travel.

6. The method of claim 1, wherein determining that the portion of the lane of travel includes the at least one lane marker demarcating the lane of travel comprises determining that the portion of the lane of travel includes at least one lane marker on one side of the lane of travel and further includes at least one other lane marker on an opposite side of the lane of travel, and wherein controlling the autonomous vehicle to navigate the lane of travel within the determined at least one lane marker demarcating the lane of travel comprises controlling the autonomous vehicle to navigate between the at least one lane marker and the at least one other lane marker.

7. The method of claim 1, wherein the portion of the lane of travel is a first portion of the lane of travel, the method further comprising:

receiving, by the one or more processors, a second plurality of remission signals based on a second portion of the lane of travel in the environment different from the first portion, wherein a given remission signal of the second plurality of remission signals comprises a respective second remission value indicative of a level of reflectiveness for the second portion of the lane of travel; and determining, by the one or more processors, a region of the lane of travel, wherein the region comprises the first portion and the second portion, wherein determining the average remission value is further based on respective remission signals of the second plurality of remission signals, wherein the average remission value is further indicative of an average level of reflectiveness for the region of the lane of travel, and wherein the known remission threshold is further indicative of a minimum level of reflectiveness for a lane marker in the region of the lane of travel.

8. The method of claim 7, further comprising:
responsive to the adjusting, the one or more processors (i) determining, based on the adjusted known remission threshold, that the region of the lane of travel includes at least one lane marker demarcating the lane of travel, and (ii) controlling the autonomous vehicle to navigate in the region of the lane of travel within the determined at least one lane marker demarcating the lane of travel.

9. The method of claim 1, further comprising:
based on the plurality of remission signals and further based on the known remission threshold, determining that the portion of the lane of travel in the environment includes a particular number of lane markers;
comparing the particular number of lane markers to a particular threshold number of lane markers; and
based on the comparison indicating that the particular number of lane markers exceeds the particular threshold, making a determination that the particular number of lane markers includes at least one false positive lane marker,
wherein adjusting the known remission threshold to be the adjusted known remission threshold is further based on the determination that the particular number of lane markers includes at least one false positive lane marker.

10. An autonomous vehicle comprising: at least one sensor configured to sense a lane of travel in an environment of the autonomous vehicle, wherein the autonomous vehicle is substantially in the lane of travel in the environment;
a computer system, wherein the computer system is configured to:
receive, from the at least one sensor, a plurality of remission signals based on a portion of the lane of travel in the environment, wherein a given remission signal of the plurality of remission signals comprises a respective remission value indicative of a level of reflectiveness for the portion of the lane of travel;
determine an average remission value based on respective remission signals of the plurality of remission signals, wherein the average remission value is indicative of an average level of reflectiveness for the portion of the lane of travel;
compare the average remission value to a known remission threshold indicative of a minimum level of reflectiveness for a lane marker in the lane of travel;
based on the comparison, adjust the known remission threshold to be an adjusted known remission threshold, wherein the adjusted remission threshold is used for only a predetermined period of time as the autonomous vehicle navigates in the lane of travel; and responsive to the adjusting, (i) determine, based on the adjusted known remission threshold, that the portion of the lane of travel includes at least one lane marker demarcating the lane of travel, and (ii) control the autonomous vehicle to navigate the lane of travel within the determined at least one lane marker demarcating the lane of travel.

11. The autonomous vehicle of claim 10, wherein the at least one sensor comprises a laser detection and ranging system.

12. The autonomous vehicle of claim 10, wherein the portion of the lane of travel is a first portion of the lane of travel, and wherein the computer system is further configured to:
receive a second plurality of remission signals based on a second portion of the lane of travel in the environment different from the first portion, wherein a given remission signal of the second plurality of remission signals comprises a respective second remission value indicative of a second level of reflectiveness for the second portion of the lane of travel;
determine a region of the lane of travel, wherein the region comprises the first portion and the second portion;
determine a second average remission value based on respective remission signals of the second plurality of remission signals, wherein the second average remission value is indicative of an average level of reflectiveness for the second portion of the lane of travel;
compare the average remission value to the known remission threshold;
based on the comparison, determine a second adjusted known remission threshold different from the adjusted known remission threshold, wherein the adjusted known remission threshold is associated with the first portion of the lane of travel, and wherein the second adjusted known remission threshold is associated with the second portion of the lane of travel; and
responsive to determining the second adjusted known remission threshold, (i) determine, based on the second adjusted known remission threshold, that the second portion of the lane of travel includes at least one second lane marker demarcating the lane of travel, and (ii) control the autonomous vehicle to navigate the region of the lane of travel within the determined at least one second lane marker demarcating the lane of travel substantially simultaneously as the controlling of the autonomous vehicle to navigate the lane of travel within the determined at least one lane marker.

13. The autonomous vehicle of claim 10, wherein the predetermined period of time is a period of time during which at least a portion of the autonomous vehicle travels past the portion of the lane of travel.

14. The autonomous vehicle of claim 10, wherein determining that the portion of the lane of travel includes the at least one lane marker demarcating the lane of travel comprises determining that the portion of the lane of travel includes at least one lane marker on one side of the lane of travel and further includes at least one other lane marker on an opposite side of the lane of travel, and
wherein controlling the autonomous vehicle to navigate the lane of travel within the determined at least one lane marker demarcating the lane of travel comprises controlling the autonomous vehicle to navigate between the at least one lane marker and the at least one other lane marker.

15. A non-transitory computer readable medium having stored therein instructions that, when executed by a computer system of an autonomous vehicle, cause the computer system to perform operations comprising:

receiving, from at least one sensor of the autonomous vehicle, a plurality of remission signals based on a portion of a lane of travel in an environment, wherein a given remission signal of the plurality of remission signals comprises a respective remission value indicative of a level of reflectiveness for the portion of the lane of travel, wherein the autonomous vehicle is substantially in the lane of travel in the environment;

determining an average remission value based on respective remission signals of the plurality of remission signals, wherein the average remission value is indicative of an average level of reflectiveness for the portion of the lane of travel;

comparing the average remission value to a known remission threshold indicative of a minimum level of reflectiveness for a lane marker in the lane of travel;

based on the comparison, adjusting the known remission threshold to be an adjusted known remission threshold, wherein the adjusted remission threshold is used for only a predetermined period of time as the autonomous vehicle navigates in the lane of travel; and responsive to the adjusting, (i) determining, based on the adjusted known remission threshold, that the portion of the lane of travel includes at least one lane marker demarcating the lane of travel, and (ii) controlling the autonomous vehicle to navigate the lane of travel within the determined at least one lane marker demarcating the lane of travel.

16. The non-transitory computer readable medium of claim 15, wherein determining that the portion of the lane of travel includes the at least one lane marker demarcating the lane of travel based on the adjusted known remission threshold comprises:

comparing the plurality of remission signals to the adjusted known remission threshold; and based on the comparison of the plurality of remission signals to the adjusted known remission threshold, determining that the portion of the lane of travel includes at least one lane marker demarcating the lane of travel.

17. The non-transitory computer readable medium of claim 15, wherein adjusting the known remission threshold to be an adjusted known remission threshold based on the comparison comprises:

based on the comparison indicating that the average remission value is greater than the known remission threshold, the one or more processors adjusting the known remission threshold to be higher such that the adjusted known remission threshold is greater than the average remission value.

18. The non-transitory computer readable medium of claim 15, wherein adjusting the known remission threshold to be an adjusted known remission threshold based on the comparison comprises:

based on the comparison indicating that the average remission value is less than the known remission threshold, the one or more processors adjusting the known remission threshold to be lower such that the adjusted known remission threshold is less than the average remission value.

19. The non-transitory computer readable medium of claim 15, wherein the predetermined period of time is a period of time during which at least a portion of the autonomous vehicle travels past the portion of the lane of travel.

20. The non-transitory computer readable medium of claim 15, the operations further comprising:

based on the plurality of remission signals and further based on the known remission threshold, determining that the portion of the lane of travel in the environment includes a particular number of lane markers;

comparing the particular number of lane markers to a particular threshold number of lane markers; and based on the comparison indicating that the particular number of lane markers exceeds the particular threshold, making a determination that the particular number of lane markers includes at least one false positive lane marker, wherein adjusting the known remission threshold to be the adjusted known remission threshold is further based on the determination that the particular number of lane markers includes at least one false positive lane marker.

* * * * *